United States Patent [19]

Evans et al.

[11] Patent Number: 5,419,524
[45] Date of Patent: May 30, 1995

[54] WEIGHT DISTRIBUTION PAD FOR TRAILERS

[76] Inventors: Leonard W. Evans; Leslie W. Evans, both of 405, 9930 Bonaventure Drive SE., Calgary, Alberta, Canada, T2J 4L4

[21] Appl. No.: 30,707

[22] Filed: Mar. 12, 1993

[51] Int. Cl.⁶ ............................................. F16M 11/00
[52] U.S. Cl. ................................. 248/346; 248/357; 108/901
[58] Field of Search ............ 248/346, 352, 357, 188.9, 248/677, 678, 679; 108/901, 902

[56] References Cited

U.S. PATENT DOCUMENTS

| | | | |
|---|---|---|---|
| D. 82,642 | 11/1930 | Rush . | |
| D. 133,106 | 7/1942 | Phillips . | |
| D. 321,498 | 11/1991 | Jones . | |
| 3,199,469 | 8/1965 | Sullivan | 108/901 X |
| 3,269,336 | 8/1966 | Naylor et al. | 108/901 X |
| 3,470,663 | 10/1969 | Tate | 248/357 X |
| 3,884,440 | 5/1975 | Rowley et al. | 248/346 X |
| 4,189,125 | 2/1980 | Little | 108/902 X |
| 4,254,927 | 3/1981 | Stonhaus | 248/346 |
| 4,474,387 | 10/1984 | Maranell et al. | 248/346 X |
| 4,991,811 | 2/1991 | Portnoy | 248/346 |
| 5,046,587 | 9/1991 | Jones | 248/346.1 X |

*Primary Examiner*—Karen J. Chotkowski
*Attorney, Agent, or Firm*—Jerry T. Kearns

[57] ABSTRACT

An injection molded one-piece glass fiber reinforced weight distribution pad for supporting parked trailers such as tractor trailers, mobile cranes, fifth wheel campers and trailers, mobile homes, recreational vehicles, and pickup camper units includes a plurality of radially and circumferentially extending intersecting struts extending upwardly from a circular base plate. The pad includes a central circular reinforced zone for supporting a support leg of a trailer or other vehicle. A handle rod extending between adjacent radial webs and aligned with an opening in the base plate forms a carrying handle for the pad. The pad resists degradation due to exposure to UV, weather, fuel, oil, moisture, and provides electrical insulation.

20 Claims, 2 Drawing Sheets

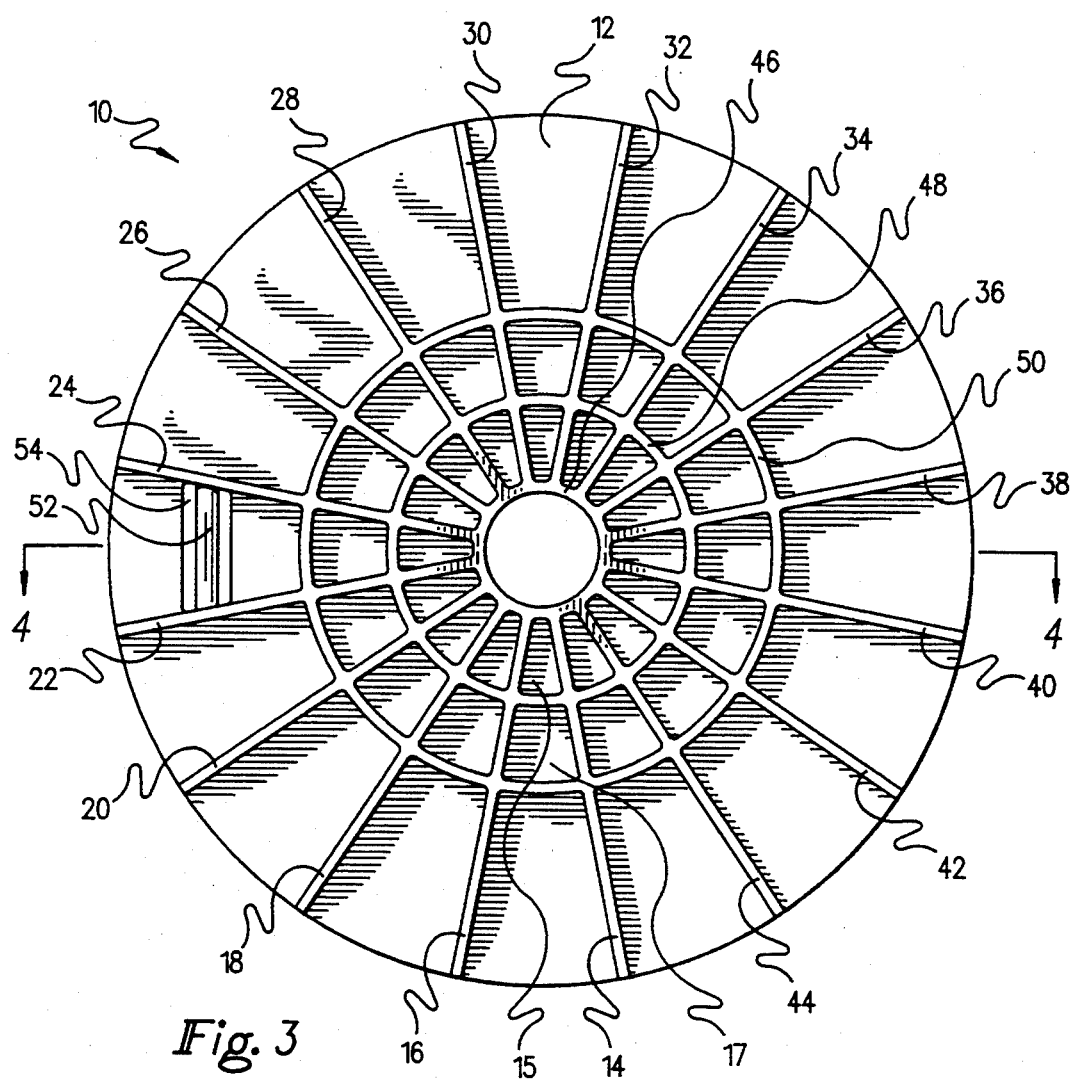
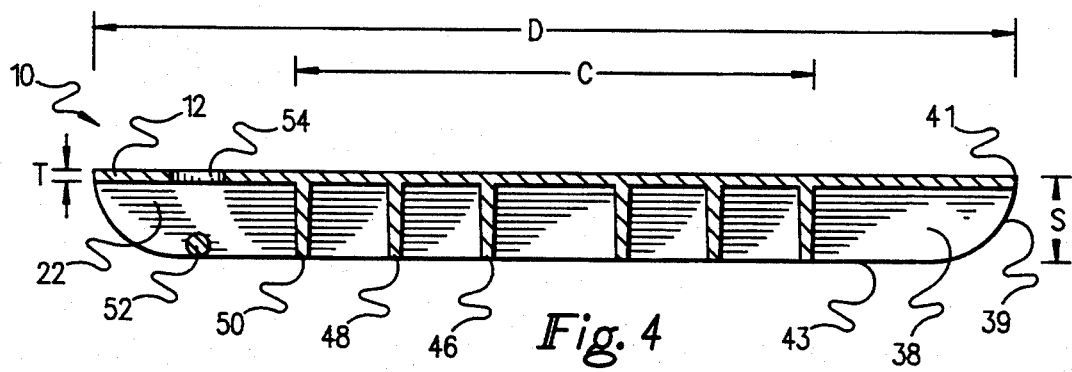

WEIGHT DISTRIBUTION PAD FOR TRAILERS

BACKGROUND OF THE INVENTION

1. Field of the Invention

The present invention relates to weight distribution pads, and more particularly pertains to a support pad adapted for placement on the ground surface beneath the support legs of trailers such as tractor trailers, mobile cranes, fifth wheel campers and trailers, mobile homes, recreational vehicles, and pickup camper units. In the absence of weight distribution pads, the support legs of such trailers frequently sink into the ground, particularly through asphalt pavement. Such trailer support leg penetration results in great damage to asphalt pavements, particularly in warm climates. Electrical insulation of the trailer from the ground is an additional desirable objective of such weight distribution pads, for the purposes of isolating any electrical equipment on the trailer and for preventing potential damage to the trailer and injury to occupants from lightning strikes.

2. Description of the Prior Art

In an effort to overcome the aforementioned problems of trailer support leg sinking and resultant pavement damage, truckers typically employ square or rectangular wooden support pads beneath the support legs of trailers. Such conventional wooden support pads suffer from numerous disadvantages: rapid wear and attendant frequent wasteful replacement; rotting due to moisture; cracking, splitting, and checking due to exposure to sunlight; necessary use of toxic wood preservatives; contamination by dirt, oil, grease, fuel, etc.; poor weight distribution due to flat square or rectangular design; and difficulty in handling and transportation due to the large and heavy volume of wood required for adequate load bearing strength. Prior art attempts to employ metal weight distribution pads have been unsuccessful due to weight, high cost, corrosion, and electrical conductivity.

SUMMARY OF THE INVENTION

Accordingly, it is an object of the present invention to provide a new and improved weight distribution pad which overcomes the aforementioned disadvantages of prior art weight distribution support pads.

It is a further object of the present invention to provide a new and improved weight distribution pad which is of a durable and reliable construction.

An even further object of the present invention is to provide a new and improved weight distribution pad which is susceptible of low cost manufacture and distribution, and thus economically available to the consuming public.

Still another object of the present invention is to provide a new and improved weight distribution pad formed from a recyclable glass reinforced nylon material.

Yet another object of the present invention is to provide a new and improved weight distribution pad which is electrically insulating, lightweight, and high strength.

Even still another object of the present invention is to provide a new and improved weight distribution pad which is easy to carry, place in operative position, store, and transport when not in use.

In order to achieve these and other objects of the invention, the present invention provides an improved injection molded one-piece glass fiber reinforced weight distribution pad for supporting parked trailers such as tractor trailers, mobile cranes, fifth wheel campers and trailers, mobile homes, recreational vehicles, and pickup camper units which includes a plurality of radially and circumferentially extending intersecting struts extending upwardly from a circular base plate. The pad includes a central circular reinforced zone for supporting a support leg of a trailer or other vehicle. A handle rod extending between adjacent radial webs and aligned with an opening in the base plate forms a carrying handle for the pad. The pad resists degradation due to exposure to UV, weather, fuel, oil, moisture, and provides electrical insulation.

These and various other advantages and features of novelty which characterize the invention are pointed out with particularly in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described preferred embodiments of the invention.

BRIEF DESCRIPTION OF THE DRAWINGS

FIG. 3 is a top plan view thereof; and

FIG. 4 is a cross-sectional view taken along line 4—4 of FIG. 3.

DETAILED DESCRIPTION OF THE PREFERRED EMBODIMENT(S)

Figure 1:
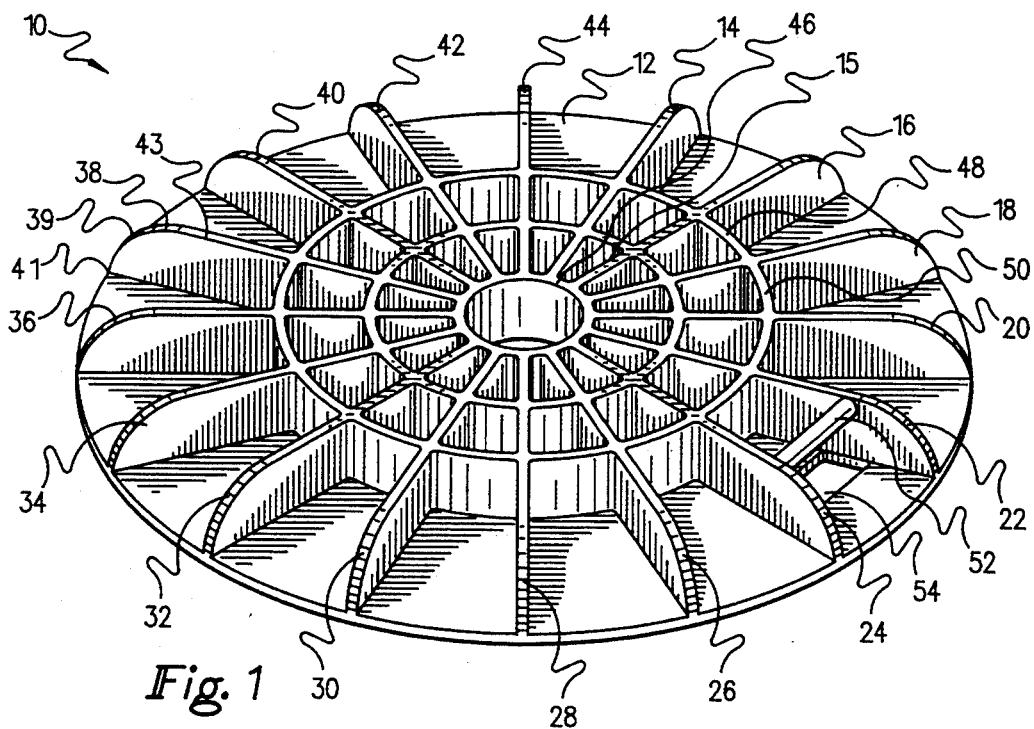
FIG. 1 is a top perspective view of a WEIGHT DISTRIBUTION PAD FOR TRAILERS according to the present invention.
Figure 2:
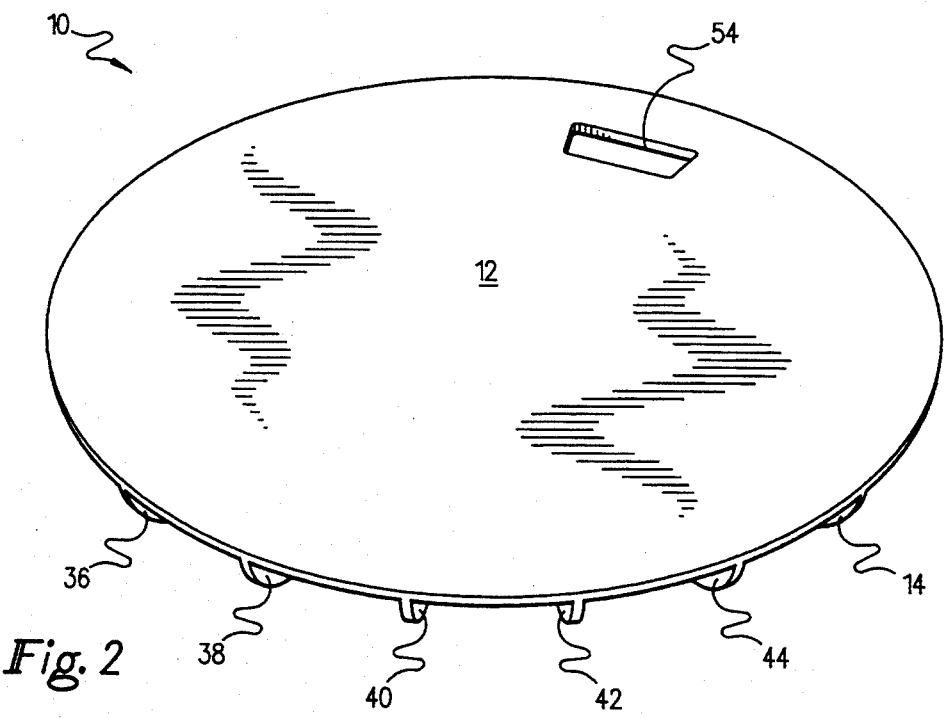
FIG. 2 is a bottom perspective view thereof.

Referring now to the drawings, wherein like reference numerals designate corresponding structure throughout the views, and referring in particular to FIGS. 1 and 3, an improved weight distribution pad 10 according to a first preferred embodiment of the invention includes a circular base plate 12 possessing a bottom surface provided with a plurality of evenly circumferentially spaced radially extending struts or ribs 14, 16, 18, 20, 22, 24, 26, 28, 30, 32, 34, 36, 38, 40, 42, and 44, each of which intersect a plurality of coaxial, progressively stepped diameter circular ribs or webs 46, 48, and 50. Each pair of adjacent radial ribs, for example, ribs 14 and 16, in conjunction with circular webs 46, 48, and 50 form a pair of radially adjacent generally wedge-shaped recesses 15 and 17.

As can be appreciated from FIGS. 1 and 4, Each radial web, for example web 38, includes a radially outermost arcuate surface 39 extending from an intersection 41 with the base plate 12 to a flat top edge 43. Circular webs 46, 48, and 50 each terminate at an upper end in a flat, annular surface substantially disposed in a common horizontal plane with the top edges of the radial ribs.

To facilitate transportation, storage, and placement of the weight distribution pad in operative position, a circular handle rod 52 extends generally transversely between radial ribs 22 and 24 along a line perpendicular to a radially extending line bisecting the circumferential angle formed by ribs 22 and 24. A generally trapezoidal window or opening 54 formed through the base plate 12 adjacent and in substantial alignment with rod 52 enables manual grasping of the pad 10 from either side.

Pad 10 may be integrally cast from a suitable plastic resin, but is preferably integrally injection molded from a glass fiber reinforced nylon material possessing a preferred ratio of 33% glass fiber to nylon. With reference to FIG. 4, the pad 10, in an example preferred embodiment, possesses a base plate 12 diameter D of about 20 inches, with a central load accepting diameter zone C defined by circular web 50 of 12 inches. The base plate 12 possesses a thickness T of about ½ inch, with the pad 10 having an overall thickness S of about 1.75 inches, resulting in a pad possessing a load bearing capacity of at least 25,000 pounds. While a pad according to the invention has been illustrated in connection with 3 circular webs and 16 radial ribs, it should be noted that more or fewer webs and ribs may be employed within the scope of the invention. Additionally, the selected dimensions and spacing of the webs, ribs, and base plates may be varied within a wide range.

In use, the pad 10 is placed on the ground surface, for example on an asphalt pavement parking lot, beneath the trailer support legs, with the ribs and webs directed upwardly as shown in FIG. 1. The trailer support legs are then lowered, in a conventional manner, until the bottom feet of the support legs contact the upper surface of the pad 10 in the load bearing region within the boundary of circular web 50. Typical trailer support legs terminate in square planar feet measuring about 10 inches by 10 inches.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A weight distribution pad, comprising:
   a substantially circular base plate having a substantially planar bottom surface adapted for ground engagement;
   a plurality of substantially coaxial radially spaced substantially circular webs upstanding from a top surface of said base plate;
   a plurality of radially extending ribs circumferentially spaced and disposed in a circular array upstanding from said base plate, said ribs intersecting and connected to said webs forming a load supporting surface whereby said interconnected webs and ribs distribute applied loads across said base plate; and
   a handle extending between two of said ribs.

2. The weight distribution pad of claim 1, wherein said ribs are substantially evenly circumferentially spaced.

3. The weight distribution pad of claim 1, wherein said base plate, said webs, and said ribs are integrally formed.

4. The weight distribution pad of claim 1, wherein said base plate, said webs, and said ribs are integrally molded from a glass reinforced nylon material.

5. The weight distribution pad of claim 1, further comprising a handle opening in said base plate.

6. The weight distribution pad of claim 1, wherein said intersecting webs and ribs form generally web shaped recesses.

7. The weight distribution pad of claim 1, wherein said handle comprises a handle rod extending generally transversely between two adjacent ones of said radial ribs along a line perpendicular to a radially extending line bisecting a circumferential angle formed by said two adjacent ribs.

8. The weight distribution pad of claim 7, further comprising a generally trapezoidal opening formed through said base plate adjacent and in substantial alignment with said handle rod to enable manual grasping of said pad from either side to facilitate transportation, storage, and placement in operative position.

9. A weight distribution pad, comprising:
   a substantially circular planar base plate;
   at least three substantially coaxial stepped diameter substantially circular webs extending upwardly from a top surface of said base plate forming a load supporting surface, each of said webs and said base plate possessing a common central axis;
   at least eight substantially evenly circumferentially spaced substantially radially extending ribs intersecting and connected to each of said circular webs;
   said base plate, said webs, and said ribs all integrally formed from a rigid plastic material whereby said interconnected webs and ribs distribute applied loads across said base plate; and
   means providing a carrying handle on said pad to facilitate transportation, storage, and placement in operative position.

10. The weight distribution pad of claim 9, wherein said ribs extend from an innermost one of said circular webs to an outer peripheral edge of said base plate.

11. The weight distribution pad of claim 9, wherein each of said ribs and said webs possess a substantially flat top surface disposed in a common horizontal plane.

12. The weight distribution pad of claim 9, wherein said base plate, said webs, and said ribs are all integrally formed from a glass reinforced nylon material.

13. The weight distribution pad of claim 9, wherein said means providing a carrying handle comprises a handle rod extending generally transversely between two adjacent ones of said radial ribs along a line perpendicular to a radially extending line bisecting a circumferential angle formed by said two adjacent ribs.

14. The weight distribution pad of claim 9, wherein said means providing a carrying handle comprises a generally trapezoidal opening formed through said base plate to enable manual grasping of said pad from either side.

15. The weight distribution pad of claim 9, wherein said means providing a carrying handle comprises:
   a handle rod extending generally transversely between two adjacent ones of said radial ribs along a line perpendicular to a radially extending line bisecting a circumferential angle formed by said two adjacent ribs; and
   a generally trapezoidal opening formed through said base plate adjacent and in substantial alignment with said handle rod to enable manual grasping of said pad from either side.

16. A weight distribution pad, comprising:
   a substantially circular planar base plate;
   at least three coaxial stepped diameter substantially circular webs extending upwardly from a top surface of said base plate, each of said webs and said base plate possessing a common central axis;

at least eight evenly circumferentially spaced radially extending ribs extending from an innermost one of said circular webs to an outer peripheral edge of said base plate, each of said ribs intersecting each of said circular webs, each of said ribs and said webs possessing a substantially flat top surface disposed in a common horizontal plane;

said base plate, said webs, and said ribs all integrally formed from a glass reinforced nylon material;

a handle rod extending generally transversely between two adjacent ones of said radial ribs along a line perpendicular to a radially extending line bisecting a circumferential angle formed by said two adjacent ribs;

a generally trapezoidal opening formed through said base plate adjacent and in substantial alignment with said handle rod to enable manual grasping of said pad from either side to facilitate transportation, storage, and placement in operative position.

17. A weight distribution pad, comprising:

a base plate;

a plurality of radially spaced substantially circular webs upstanding from said base plate;

a plurality of radially extending ribs upstanding from said base plate, said ribs intersecting said webs and forming a load supporting surface; and a handle member extending transversely between two of said ribs and a handle opening formed in said base plate adjacent said handle member.

18. A weight distribution pad, comprising:

a base plate;

a plurality of radially spaced substantially circular webs upstanding from said base plate;

a plurality of radially extending ribs upstanding from said base plate, said ribs intersecting said webs and forming a load supporting surface; and a handle rod extending generally transversely between two adjacent ones of said radial ribs along a line perpendicular to a radially extending line bisecting a circumferential angle formed by said two adjacent ribs.

19. A weight distribution pad, comprising:

a substantially circular base plate having a substantially planar bottom surface adapted for ground engagement;

a plurality of substantially coaxial radially spaced substantially circular webs upstanding from a top surface of said base plate;

a plurality of radially extending ribs circumferentially spaced and disposed in a circular array upstanding from said base plate, said ribs intersecting and connected to said webs forming a load supporting surface whereby said interconnected webs and ribs distribute applied loads across said base plate; and a handle opening in said base plate.

20. A weight distribution pad, comprising:

a substantially circular base plate having a substantially planar bottom surface adapted for ground engagement;

a plurality of substantially coaxial radially spaced substantially circular webs upstanding from a top surface of said base plate;

a plurality of radially extending ribs circumferentially spaced and disposed in a circular array upstanding from said base plate, said ribs intersecting and connected to said webs forming a load supporting surface whereby said interconnected webs and ribs distribute applied loads across said base plate; and a handle member extending between two of said ribs and a handle opening formed in said base plate adjacent said handle member.

* * * * *